(12) United States Patent
Semichev et al.

(10) Patent No.: US 10,572,653 B1
(45) Date of Patent: Feb. 25, 2020

(54) COMPUTER-BASED SYSTEMS CONFIGURED FOR MANAGING AUTHENTICATION CHALLENGE QUESTIONS IN A DATABASE AND METHODS OF USE THEREOF

(71) Applicant: Capital One Services, LLC, McLean, VA (US)

(72) Inventors: Sergey E. Semichev, Sterling, VA (US); Lele Liang, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/565,140

(22) Filed: Sep. 9, 2019

(51) Int. Cl.
| | |
|---|---|
| H04L 29/06 | (2006.01) |
| G06F 21/45 | (2013.01) |
| G06N 20/00 | (2019.01) |
| G06Q 20/40 | (2012.01) |

(52) U.S. Cl.
CPC ............. *G06F 21/45* (2013.01); *G06N 20/00* (2019.01); *G06Q 20/4016* (2013.01); *G06F 2221/2103* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,021,553 B1* | 4/2015 | Corn | ....................... | G06F 21/31 726/2 |
| 9,830,599 B1* | 11/2017 | Khen | ................. | G06Q 20/4014 |
| 10,147,065 B1* | 12/2018 | Yiftachel | ........... | G06Q 10/0635 |
| 10,380,685 B1* | 8/2019 | Phillips | .................. | H04L 9/3247 |
| 2008/0133716 A1* | 6/2008 | Rao | ........................ | G06Q 30/08 709/220 |
| 2008/0319869 A1* | 12/2008 | Carlson | .................. | G06Q 20/02 705/26.1 |
| 2010/0114776 A1* | 5/2010 | Weller | ..................... | G06F 21/31 705/44 |
| 2012/0054834 A1* | 3/2012 | King | ....................... | G06F 21/31 726/4 |
| 2012/0124664 A1* | 5/2012 | Stein | ....................... | G06F 15/16 726/22 |
| 2013/0160098 A1* | 6/2013 | Carlson | ................... | G06F 21/45 726/6 |

(Continued)

*Primary Examiner* — Malcolm Cribbs
(74) *Attorney, Agent, or Firm* — Greenberg Traurig, LLP

(57) ABSTRACT

A method executed by a processor may include storing account activity data in a database which identifies prior account activities performed by customers in their respective accounts associated with a financial institution. The database may be accessible only by computing systems of the financial institution. A set of challenge questions may be received for authenticating customers to perform high-risk activities in their respective accounts that are based on prior account activities. A machine learning model may be used to determine an authentication score used for ranking each challenge question in the set of challenge questions. An electronic request may be received from an unverified customer who desires to perform high-risk activities in an account. Challenge questions may be selected based on the ranking. The unverified customer may be verified when correctly answering the selected challenge questions. The verified customer may be allowed to perform high-risk activities in the account.

20 Claims, 10 Drawing Sheets

(56) References Cited

U.S. PATENT DOCUMENTS

| | | | | |
|---|---|---|---|---|
| 2013/0239185 A1* | 9/2013 | Orttung | G06F 21/40 | |
| | | | 726/5 | |
| 2014/0189829 A1* | 7/2014 | McLachlan | H04L 63/08 | |
| | | | 726/6 | |
| 2015/0161366 A1* | 6/2015 | Ghosh | G06F 21/31 | |
| | | | 726/7 | |
| 2015/0242858 A1* | 8/2015 | Smith | G06Q 20/4016 | |
| | | | 705/75 | |
| 2015/0310204 A1* | 10/2015 | Pruthi | G06F 21/46 | |
| | | | 726/25 | |
| 2015/0324559 A1* | 11/2015 | Boss | H04L 63/20 | |
| | | | 726/1 | |
| 2015/0348039 A1* | 12/2015 | Allen | G06Q 20/4016 | |
| | | | 705/44 | |
| 2016/0042354 A1* | 2/2016 | Canis | G06Q 20/4016 | |
| | | | 705/44 | |
| 2016/0103982 A1* | 4/2016 | Boss | G06F 21/31 | |
| | | | 726/7 | |
| 2017/0076265 A1* | 3/2017 | Royyuru | G06Q 20/18 | |
| 2018/0285877 A1* | 10/2018 | Bracconeri | G06Q 20/4016 | |
| 2018/0295128 A1* | 10/2018 | Drake, II | H04L 63/105 | |
| 2018/0302226 A1* | 10/2018 | Heimlicher | H04L 63/061 | |
| 2019/0014097 A1* | 1/2019 | Hwang | H04L 63/08 | |
| 2019/0058992 A1* | 2/2019 | Kurian | H04L 63/08 | |
| 2019/0295085 A1* | 9/2019 | Ashiya | G06N 20/00 | |
| 2019/0347598 A1* | 11/2019 | Sandusky | G06Q 10/06398 | |

* cited by examiner

AGENT NAME: SARAH JONES

CUSTOMER VERIFICATION FORM ~105

MR. ROBERT SMITH REQUESTS TO EXTERNALLY TRANSFER $5,500 FROM HIS CHECKING ACCT # 5341234567 IN OURBANK, USA TO ACCOUNT #759876543210 IN ANYBANK, USA —110

PLEASE CHALLENGE MR. SMITH WITH THE FOLLOWING QUESTIONS:

115A — 1. WHAT PRODUCTS/SERVICES DO YOU USE IN OURBANK, USA?
(A) CHECKING (B) MONEY MARKET (C) CREDIT CARD (D) ALL OF THE ABOVE
ANSWER: (D)
DID ROBERT SMITH ANSWER CORRECTLY? [YES] [NO]
120   125

115B — 2. WHAT WAS THE LAST DIGITAL DEVICE YOU USED TO CONTACT OURBANK, USA?
(A) IPHONE7 (B) SAMSUNG GALAXY S8 (C) NOT APPLICABLE
ANSWER: (C) → CUSTOMER NOT DIGITALLY ENROLLED
DID ROBERT SMITH ANSWER CORRECTLY? [YES] [NO]
120   125

115C — 3. WHEN DID YOU LAST GIVE OURBANK, USA A CALL?
(A) LAST MONTH (B) 6 MONTHS AGO (C) ONE YEAR AGO
ANSWER: (B)
DID ROBERT SMITH ANSWER CORRECTLY? [YES] [NO]
120   125

ROBERT SMITH ANSWERED QUESTIONS 1, 2 AND 3 CORRECTLY. —130
⇨ CUSTOMER VERIFIED!

ROBERT SMITH DID NOT ANSWER ANY QUESTIONS CORRECTLY
POTENTIAL FRAUD DETECTED

⇨ INFORM ROBERT SMITH TO PRESENT HIMSELF AT A BANK —130
BRANCH IN PERSON WITH <u>TWO</u> FORMS OF IDENTIFICATION TO
INITIATE REQUESTED TRANSACTION

FIG. 2B

| RANK | CHALLENGE QUESTION | AUTHENTICATION SCORE | NO. OF CORRECT ANSWERS | NO. OF CORRECT ANSWERS WITH FRAUD TAG |
|---|---|---|---|---|
| 1 | CHQUESTID7 | 0.952 | 10,000 | 500 |
| 2 | CHQUESTID2 | 0.945 | 10,305 | 600 |
| 3 | CHQUESTID5 | 0.941 | 10,400 | 650 |
| 4 | CHQUESTID10 | 0.930 | 10,005 | 750 |
| 5 | CHQUESTID6 | 0.926 | 10,035 | 800 |
| 6 | CHQUESTID8 | 0.910 | 10,055 | 1,000 |
| 7 | CHQUESTID3 | 0.835 | 10,120 | 2,000 |
| 8 | CHQUESTID9 | 0.770 | 10,040 | 3,000 |
| 9 | CHQUESTID1 | 0.667 | 10,030 | 5,000 |
| 10 | CHQUESTID4 | 0.526 | 10,000 | 9,000 |

COMPUTER-BASED SYSTEMS CONFIGURED FOR MANAGING AUTHENTICATION CHALLENGE QUESTIONS IN A DATABASE AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of managing authentication challenge questions in a database.

BACKGROUND OF TECHNOLOGY

A computer network platform/system may include a group of computers (e.g., clients, servers, smart routers and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that may include at least the following steps of:
storing, by a processor, in a database in a computer memory, account activity data identifying prior account activities performed by a plurality of customers in their respective accounts associated with a financial institution;
where the database stored in the computer memory may be accessible only by computing systems of the financial institution;
receiving, by the processor, a set of challenge questions for authenticating the plurality of customers to perform high-risk activities in their respective accounts;
where the set of challenge questions may be based on the prior account activities performed by the plurality of customers in their respective accounts;
utilizing, by the processor, at least one machine learning model to determine an authentication score for each challenge question in the set of challenge questions;
where the authentication score of each respective challenge question may be based on:
i) a first number of instances of a plurality of customer interactions with the financial institution that a correct answer to a respective challenge question in the set of challenge questions has been given by the plurality of customers of the financial institution,
ii) a second number of instances of the plurality of customer interactions with the financial institution that the correct answer to the respective challenge question in the set of challenge questions has been given by at least one fraudulent person,
iii) a third number of instances of the plurality of customer interactions with the financial institution that an incorrect answer to a respective challenge question in the set of challenge questions has been given by the plurality of customers of the financial institution, and
iv) a fourth number of instances of the plurality of customer interactions with the financial institution that the incorrect answer to the respective challenge question in the set of challenge questions has been given by the at least one fraudulent person;
identifying, by the processor, the at least one fraudulent person from the plurality of customers by tagging customer interactions in the plurality of customer transactions as fraudulent;
training, by the processor, the at least one machine learning model with training data for each challenge question in the set of challenge questions for each respective customer interaction from the plurality of customer interactions;
where the training data may include:
(i) a first indication that a correct or an incorrect answer was given for each challenge question in the set of challenge questions for each respective customer interaction from the plurality of customer interactions, and
(ii) a second indication of a fraud tag applied to each respective customer interaction from the plurality of customer interactions;
ranking, by the processor, challenge questions of the set of challenge questions from a highest authentication score to a lowest authentication score;
receiving, by the processor, an electronic request on a computing device from an unverified customer who desires to perform one or more high-risk activities in an account of a particular customer of the plurality of customers;
selecting, by the processor, a predefined number of challenge questions having the highest authentication scores based on the ranking;
causing, by the processor, to display on a screen of the computing device the selected challenge questions;
receiving, by the processor, answers to the selected challenge questions;
authenticating, by the processor, the unverified customer to form a verified customer when the answers to the selected challenge questions are correct; and
allowing, by the processor, the verified customer from the plurality of customers to perform the one or more high-risk activities with a respective account associated with the verified customer.

In some embodiments, the present disclosure provides an exemplary technically improved computer-based system that may include at least the following components:
a computer memory; and
a processor configured to:
store in a database in the computer memory, account activity data identifying prior account activities performed by a plurality of customers in their respective accounts associated with a financial institution;
where the database stored in the computer memory may be accessible only by computing systems of the financial institution;

receive a set of challenge questions for authenticating the plurality of customers to perform high-risk activities in their respective accounts;

where the set of challenge questions may be based on the prior account activities performed by the plurality of customers in their respective accounts;

utilize at least one machine learning model to determine an authentication score for each challenge question in the set of challenge questions;

where the authentication score of each respective challenge question may be based on:

i) a first number of instances of a plurality of customer interactions with the financial institution that a correct answer to a respective challenge question in the set of challenge questions has been given by the plurality of customers of the financial institution, ii) a second number of instances of the plurality of customer interactions with the financial institution that the correct answer to the respective challenge question in the set of challenge questions has been given by at least one fraudulent person, iii) a third number of instances of the plurality of customer interactions with the financial institution that an incorrect answer to a respective challenge question in the set of challenge questions has been given by the plurality of customers of the financial institution, and iv) a fourth number of instances of the plurality of customer interactions with the financial institution that the incorrect answer to the respective challenge question in the set of challenge questions has been given by the at least one fraudulent person;

identify the at least one fraudulent person from the plurality of customers by tagging customer interactions in the plurality of customer transactions as fraudulent;

train the at least one machine learning model with training data for each challenge question in the set of challenge questions for each respective customer interaction from the plurality of customer interactions;

where the training data may include:
  (i) a first indication that a correct or an incorrect answer was given for each challenge question in the set of challenge questions for each respective customer interaction from the plurality of customer interactions, and
  (ii) a second indication of a fraud tag applied to each respective customer interaction from the plurality of customer interactions;

rank challenge questions of the set of challenge questions from a highest authentication score to a lowest authentication score;

receive an electronic request on a computing device from an unverified customer who desires to perform one or more high-risk activities in an account of a particular customer of the plurality of customers;

select a predefined number of challenge questions having the highest authentication scores based on the ranking;

cause to display on a screen of the computing device the selected challenge questions;

receive answers to the selected challenge questions;

authenticate the unverified customer to form a verified customer when the answers to the selected challenge questions are correct; and allow the verified customer from the plurality of customers to perform the one or more high-risk activities with a respective account associated with the verified customer.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 2A and 2B depict an exemplary graphic user interface for using authentication challenge questions, in accordance with one or more embodiments of the present disclosure;

DETAILED DESCRIPTION

Figure 1:
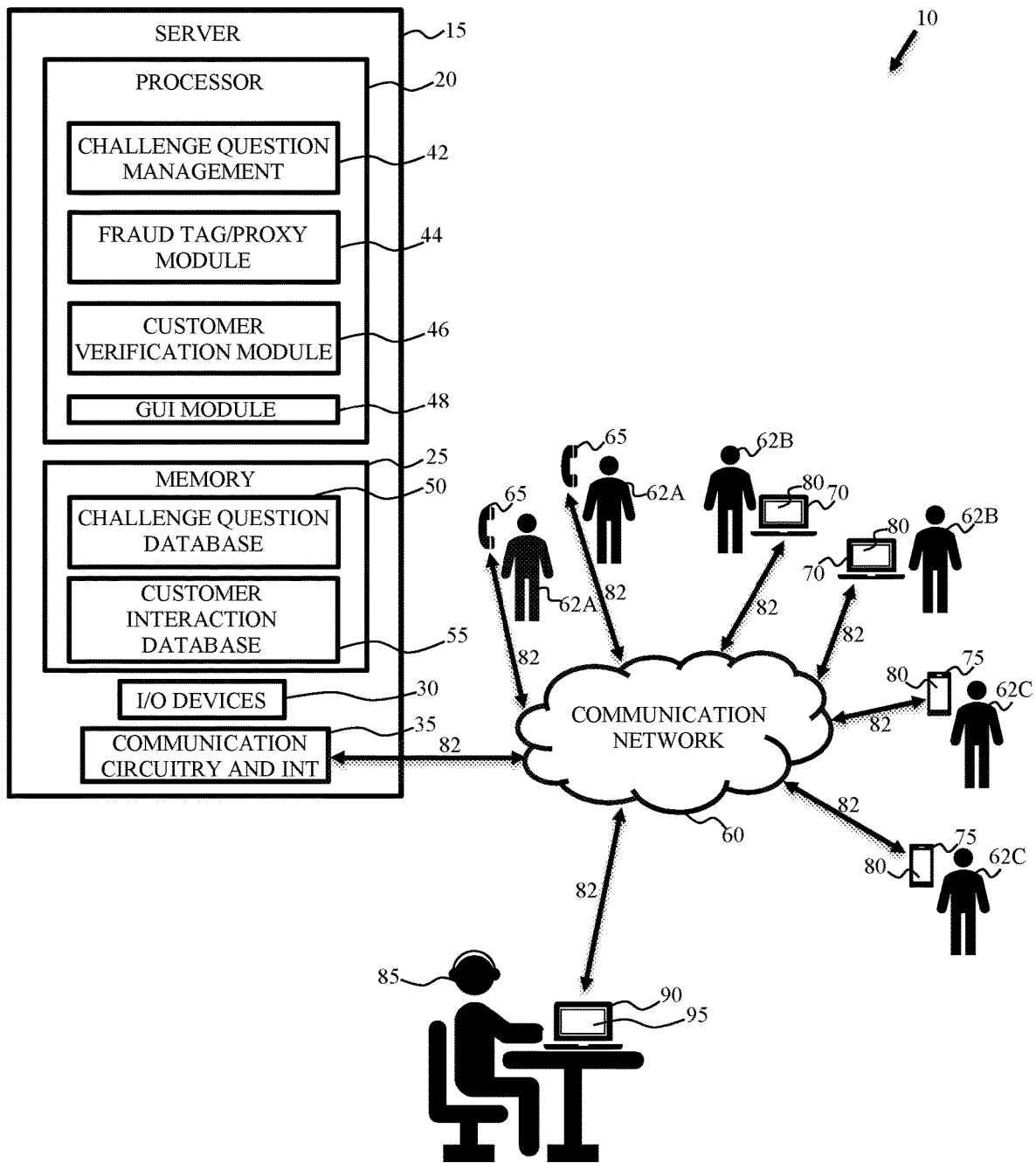
FIG. 1 depicts an exemplary inventive system for managing authentication challenge questions in a database and methods of use thereof, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe a system for managing authentication challenge questions in a database and methods of uses thereof. A customer having an account, such as a banking, a credit, mortgage, and/or an investment account, managed by a financial institution or an entity, may request to perform one or more high-risk activity on the account. In response, the computing system of the financial institution or entity may authenticate the unverified customer by presenting the unverified customer with a predefined number of challenge questions, such as 2-5 challenge questions, for example, based on information known only to the financial institution or entity. When the unverified customer successfully answers a set of challenge questions, the unverified customer becomes verified or authenticated to perform the high-risk activities on the account of the customer.

In the context of the present disclosure, high-risk activities may include actions or transactions that the customer wishes to perform on the account that may cause excess risk or accounting over risk to the financial institution or entity. If a fraudster or a criminal posing as the customer were to perform the same high-risk activities on the customer account, the fraudster or the criminal may gain access to the customer account. High-risk activities may include a change of an account address, a change of an account e-mail address, a change in a cellphone number associated with an account, a change in a telephone number associated with an account, a balance transfer request, and/or a request to have a credit card sent to a new address, for example.

FIG. 1 depicts an exemplary inventive system 10 for managing authentication challenge questions in a database and methods of use thereof, in accordance with one or more embodiments of the present disclosure. System 10 may include a computer server 15 managed by a financial institution or entity communicating 82 over a communication network 60 with communication devices of a plurality of customers 62 and/or a computer 90 with a display 95 of a representative or an agent 85 of the financial institution or entity.

In some embodiments, the communication devices may include a telephone 65a of a customer 62A communicating 82 with agent 85 the financial institution or entity. Agent 85 may interact with customer 62A with information about customer 62A appearing on a graphic user interface on display 95 of computer 90. In other embodiments, the communication devices may include a client computer 20 with a graphic user interface on a display 80 of customer 62B or a mobile device 75 with a graphic user interface on display 80 of customer 62C.

In some embodiments, computer server 15 may include a computer processor 20, a computer memory 25, input/output devices 30, and communication circuitry and interface 35 for communicating 82 over communication network 60. In other embodiments, each of the computing devices (e.g., computers 70 and 90, and mobile devices 75) may similarly include a processor, a memory, I/O devices, and communication circuitry.

In some embodiments, memory 50 communicating with processor 20 may store a number of databases, such as a challenge question database 50 and/or a customer interaction database 55. Customer interaction database 55 may include records of a plurality of customer interactions of a respective plurality of customers interacting with the financial institution or entity. Memory 50 may store software whose code that when executed by processor 20, causes the processor to manage authentication challenge questions in database 50 which may be used to verify customers wishing to perform high-risk activities in their respective accounts in the financial institution or entity.

In some embodiments, the software executable by processor 20 may include a challenge question management module 42, a fraud tag/proxy module 44, a customer verification module 46, and a graphic user interface module 48.

One technical problem for authenticating a customer to perform high-risk activities in the customer's account arises when standard proprietary-based questions are used by a bank, for example, in knowledge based authentication (KBA) schemes. The knowledge may be obtained from public databases, such as credit records, for example, of the customer. Thus, KBA authentication questions may include, for example, "what is the color of your car you own", "what are the previous addresses that you lived at", etc. This information may be published in criminal forums and/or on the dark web, for example, and may be easily obtained by criminals and/or fraudsters. These standard proprietary-based questions may be easily breached and once the fraudster answers these questions, the fraudster will be granted access to the customer's account to perform high-risk activities.

Step-up authentication tools, such as sending a one-time code to the customer's cellphone, or requesting the customer to send, for example, a scanned copy of the customer's government-issued identification may provide extra protection against spoofing. While in general, these authentication methods have been safer than KBA-based schemes, they are also being compromised by criminals and fraudsters.

The embodiments of the present disclosure taught herein provide a technical solution to these technical problems, namely that the knowledge used in generating the knowledge-based questions may use proprietary data known only to the financial institution or entity. The knowledge-based questions may challenge the customer to answer challenge questions about which accounts and/or account details that the customer has with the financial institution or entity. The information may be stored in memory 25 in a customer database, and/or information about previous interactions that the customer had with the financial institution or entity stored in customer interaction database 55. These databases may be assessible only by the computing system of the financial institution or entity. Thus, this information is difficult for a fraudster and/or a criminal to obtain unless the computerized system of the financial institution or entity was breached.

Furthermore, the authentication challenge questions may be further refined by using at least one machine learning algorithm so as to determine which challenge questions in a set of challenge questions have a better chance or probability for obtaining a correct answer from the customer and a wrong answer from a fraudster. The machine learning algorithm may apply an authentication score to each challenge question in the set. The set of challenge questions may be stored, for example, in challenge question database 50. Processor 20 implementing challenge question management module 42 may continuously rank the challenge questions in the set of challenge questions. The highest ranked challenge questions in the set of challenge questions may be used to validate the customer to perform high-risk activity in the customer's account.

FIGS. 2A and 2B depict an exemplary graphic user interface 100 for using authentication challenge questions, in accordance with one or more embodiments of the present disclosure. FIG. 2A depicts exemplary graphic user interface (GUI) 100 appearing on display 95 of agent 85 when interacting over a telephonic voice channel, for example, with customer 62A using telephone 65. In the following exemplary scenario, customer 62A (e.g., Mr. Robert Smith) may call into a call center of the financial institution, such as a bank, for example. After requesting that agent 85 (e.g., Sarah Jones) of OURBANK, USA initiates a request to externally transfer $5500 from Robert Smith's checking account number 5341234567 to account number 759876543210 in ANYBANK, USA.

In some embodiments, customer verification module 46 may identify Robert's Smith request as a high-risk activity, and may trigger challenge question management module 42 to fetch three challenge questions from challenge question database 50 for Robert Smith to answer by displaying the questions in a customer verification form 105 on GUI 100 appearing to agent 85 on display 95.

In some embodiments, GUI 100 may display request 110 and may instruct agent 85 (e.g., Sarah Jones) to challenge Mr. Smith with a predefined number of challenge questions, in this example, three challenge questions 115A, 115B, and 115C. In other embodiments, the three challenge questions may be multiple choice questions. The exemplary questions may be based on account data and/or previous interactions of customer Robert Smith with OURBANK, USA. For example, first challenge question 115A may include "What products/services do you use in OURBANK, USA" (e.g., a checking account, a savings account, a credit card account, a brokerage account, and/or a mortgage account). For challenge question 115A, GUI 100 may display multiple choices: (A) CHECKING, (B) MONEY MARKET, (C) CREDIT CARD, and (D) ALL OF THE ABOVE.

Similarly, second challenge question 115B may include "What was the last digital device you used to contact OURBANK, USA with multiple choices: (A) IPHONE7, (B) Samsung Galaxy S8, or (C) not applicable (e.g., customer does not use a digital device with the bank). Third challenge question 115C may include "When did you last give OURBANK, USA a call?". GUI 100 may display the following multiple choices: (A) last month, (B) 6 months ago, (C) one year ago.

In some embodiments, agent 85 may read each of the challenge questions to Robert Smith though telephone 65. When Robert Smith provides an answer to agent 85, agent 85 may compare the answer given by Robert Smith over telephone 65 to the answer displayed in GUI 100. If Robert Smith answered the question correctly or incorrectly, agent 85 may click on a YES button 120 or a NO button 125, respectively to enter Robert Smith's answer.

In some embodiments, GUI 100 may display results 130 of the authentication challenge question query to agent 85. Results summary 130 may inform agent 85 that based on the customer's answers in correctly answering questions 1, 2 and 3, customer verification module 46 assessed that the customer is verified to perform high-risk activities in the customer's account.

In some embodiments as shown in FIG. 2B, result summary 130 on a GUI 100B may inform agent 85 that based on the customer's answers in incorrectly answering all of the challenge questions, customer verification module 46 assessed that the customer speaking with agent 85 may potentially be a fraudster. In order to gain permission to perform the high-risk activity in the customer's account, the customer Robert Smith needs to present himself physically at a branch of OURBANK, USA with two forms of identification to initiate the requested transaction.

In some embodiments, at least one machine learning model may be used to dynamically improve the questions for obtaining a correct answer by the customer and a wrong answer by a fraudster. Training the at least one machine learning model may include providing data including a number of correct and wrong answers given to each of the challenge questions stored in challenge question database 50 in each customer interaction from a plurality of customer interactions stored in a customer interaction database 55. Any of the customer interactions in the plurality of customer interactions stored in customer interaction database 55 may include a fraud tag indicating that the customer interaction was suspected of being a fraudulent transaction made by a fraudster.

In some embodiments, training the at least one machine learning model may be performed using training data taken from customer interaction database 55 of the plurality of customers of the financial institution. Training the at least one machine learning model using the training data may maximize the number of instances for a given challenge question that the customer answers correctly and may minimize the number of instances for the same given challenge questions that a fraudster answers correctly.

In some embodiments, the training data in the training dataset may include, for example, a first indication that a correct or an incorrect answer was given for each challenge question in the set of challenge questions for each respective customer interaction from the plurality of customer interactions, and a second indication of a fraud tag applied to each respective customer interaction from the plurality of customer interactions.

In some embodiments, training the at least one machine learning model may occur over a predefined period such as over months or days. The training process may take one day, for example, to render new version of the model. The model may then be retrained once new customer interaction data may become available as the fraud investigation team updates the data and re-ranks the challenge questions in the set of challenge questions.

In some embodiments, training the at least one machine learning model may include training multiple machine learning models. Customer verification module 46 may select the best questions selected by the best performing model.

In some embodiments, training the at least one machine learning model may include applying a loss function to punish the model performance. For example, the model may rank the question higher (e.g., assign a higher authentication score) in the training dataset for a given customer interaction for a given challenge question if a customer answers the given challenge question correctly. Conversely, the model may apply the loss function and rank the challenge question lower (e.g., assign a lower authentication score) when a fraudster and/or criminal answers the question correctly.

In some embodiments, the at least one machine learning model may include a multi-armed bandit model or a multi-class classifier neural network model, for example. In other embodiments, the machine learning models may be improved using a gradient boosting machine (GBM), a multinomial output, and/or random forest learning models.

Figure 3:
FIG. 3 depicts an exemplary table of ranked authentication challenge questions, in accordance with one or more embodiments of the present disclosure.

FIG. 3 depicts an exemplary table 140 of ranked authentication challenge questions, in accordance with one or more embodiments of the present disclosure. The at least one machine learning model may be used to compute an authentication score 155 for each challenge question 150 in a set of challenge questions (e.g., the 10 challenge questions denoted as CHQUESTID1 . . . CHQUESTID10) stored in challenge question database 50. Authentication score 155 for each challenge question may be based on a first number 160 denoted $N_1$ of instances a correct answer was obtained for a challenge question in customer interactions untagged as fraudulent (e.g., a valid customer interaction) and on a second number 165 denoted $N_2$ of instances that a correct answer was obtained for the challenge question in customer interactions tagged as fraudulent. In other embodiments, the authentication score for each challenge question may be based on a third number $N_3$ of instances an incorrect answer was obtained for a challenge question in customer interactions untagged as fraudulent (e.g., a valid customer interaction) and on a fourth number $N_4$ of instances that an incorrect answer was obtained for the challenge question in customer interactions tagged as fraudulent. The number of trials in customer interaction database 55 (e.g., total number of customer interactions) for each challenge question is the sum $N_1+N_2+N_3+N_4$.

In some embodiments, customer interactions may be tagged as fraudulent but there may be one or more challenge questions in the set of the plurality of challenge questions stored in challenge question database 50 that no fraudster was able to answer correctly (e.g., $N_2=0$). In this scenario, the authentication score for the one or more challenge questions that no fraudster was able to answer correctly may be based on $N_1$ and $N_3$.

The embodiments shown in exemplary table 140 of FIG. 3 are merely for conceptual clarity, and not by way of limitation of the embodiments of the present disclosure taught herein. Any suitable function, such as the at least one machine learning model, for computing authentication score 155 may be used, which may be any function of the first ($N_1$), second ($N_2$), third ($N_3$), and fourth ($N_4$) number of instances, or any combination thereof. Any number of challenge questions may be ranked using the methods shown herein, such as 10-50 challenge questions, for example, from which any predefined number of challenge questions, such as 2-5 challenge questions, for example, may be presented to the customer when the customer requests to perform high risk activity in the customer's account. $N_1$, $N_2$, $N_3$, and $N_4$ may be based on the size of the customer interaction database, on the order of 10,000, 1,000,000 or 10,000,000 customer interaction records.

In some embodiments, challenge question management module 42 may be configured to apply a rank 145 to each challenge question 150 in the set of challenge questions. In other embodiments, challenge question management module 42 may rank each challenge question 150 in the set of challenge questions from a highest authentication score to a lowest authentication score. Challenge question management module 42 may maintain the ranking of the set of the challenge questions in challenge question database 50. Customer verification module 46 may use a predefined number of challenge questions in the set of challenge questions (e.g., the highest ranked challenge questions) to validate the customer to perform high-risk activity in the customer's account.

Figure 4:
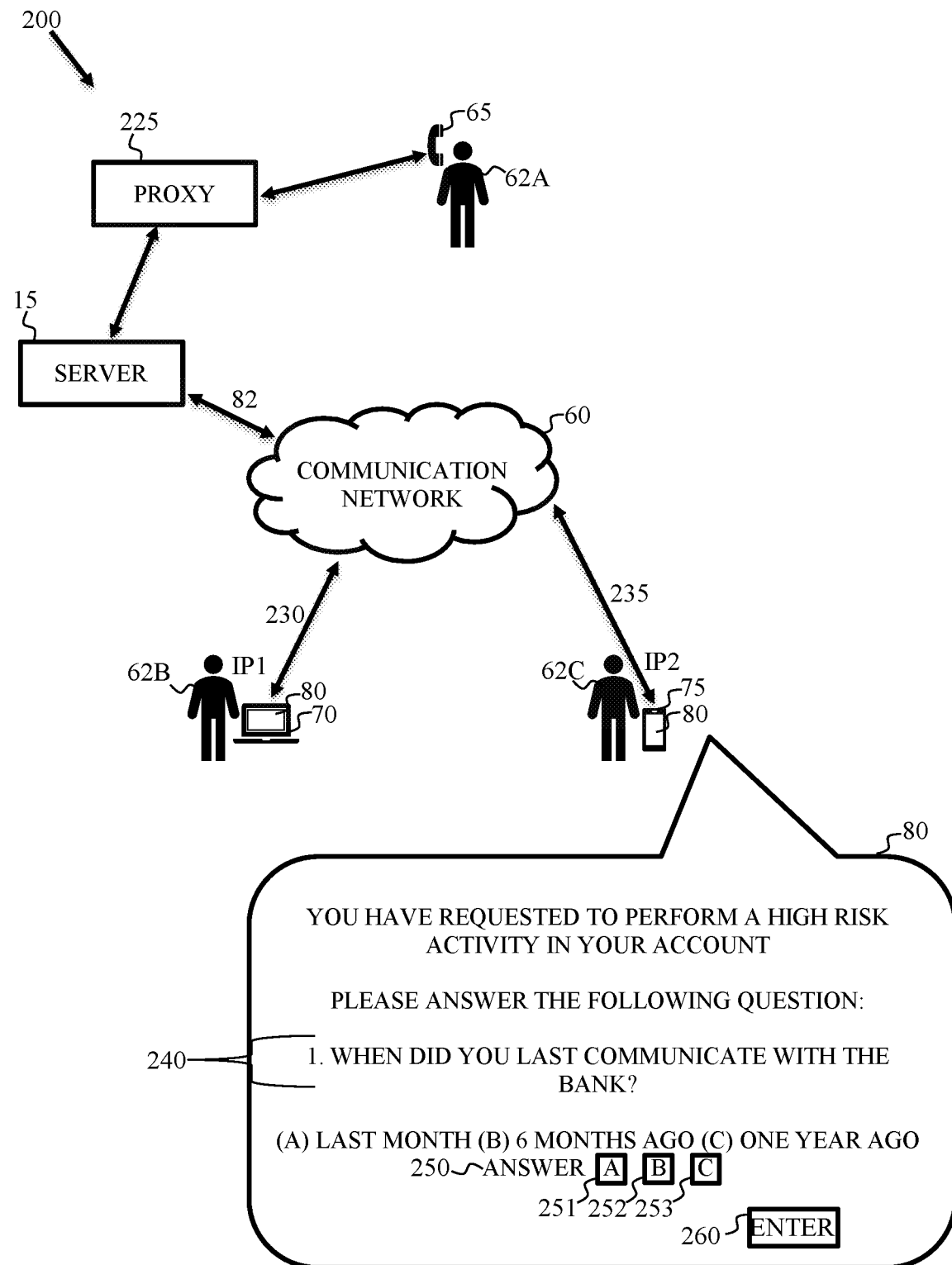
FIG. 4 depicts an exemplary inventive system for identifying at least one fraudulent person from a plurality of customers, in accordance with one or more embodiments of the present disclosure.

FIG. 4 depicts an exemplary inventive system 200 for identifying at least one fraudulent person from a plurality of customers, in accordance with one or more embodiments of the present disclosure. System 200 may include customer 62A communicating with server 15 over a voice channel relayed through a proxy 225 during a particular customer interaction. Customer 62B using computer 70 may communicate 230 with server 15 of the financial institution over communication network 60 with an IP address IP1. Customer 62C using mobile device 75 may communicate 235 with server 15 of the financial institution over communication network 60 with an IP address IP2.

In some embodiments, when customers 62B and/or 62C using computing devices to communicate with the customer institution to request to perform a high-risk activity, GUI module 48 may cause a pop-up window to display on display 80. The pop-up window may notify customer 62C that the request to perform a high-risk activity requires additional authentication.

Customer 62C may then be instructed in the pop-up window to answer the following questions. A first question 240 with multiple answers may appear "WHEN DID YOU LAST COMMUNICATE WITH THE BANK?". Display 80 may further display possible answers 250: (A) LAST MONTH, (B) 6 MONTHS AGO, (C) ONE YEAR AGO. Customer 62C may then click on a button A 251, a button B 252, and a button C 253 for customer 62C to enter the answer to question 240. Customer 62C may then click on an ENTER button 260 to record answer 250 to challenge question 240. The authentication process may proceed similarly as shown in the embodiments of FIGS. 2A and 2B.

In some embodiments, a fraud department agent of the financial institution may tag certain customer interactions in the plurality of customer interactions as fraudulent. This may occur after a customer may self-report that there are unauthorized charges posted in the customer's account. In other embodiments, fraud department agents may examine previous interactions between the customer and the financial institution, and may determine that certain accounts are connected to fraudsters and/or criminals and tag them accordingly.

In some embodiments, proxy 225 may identify that the telephone number of customer 62A may be associated with fraudsters, criminals, or the telephone number has a high spoofing risk. Fraud tag/proxy module 44 in server 15 may identify the telephone number associated with criminals and automatically apply a fraud tag to the customer interaction. In other embodiments, fraud tag/proxy module 44 may assess that the telephone number of the customer is associated with multiple other accounts in the financial institution or entity, and may tag the customer interaction as fraudulent. In yet other embodiments, server 15 may assess that a device ID of the computerized device used in a customer interaction with the financial institution may be linked to other fraudulent accounts.

In some embodiments, fraud tag/proxy module 44 may assess that IP address IP1 may be associated with fraudsters or criminals and automatically tag the customer interaction as fraudulent, while IP2 may be a valid IP address of customer 62C.

In some embodiments, after a high-risk activity was validated and performed in a customer's account, server 15 in scanning data in customer interaction database 55 may detect that a customer may have logged into the customer's account on a computing device located in Rome or Nigeria while the customer's home address may be in New York. An agent of the financial institution may contact the customer overseas to confirm the transaction.

In some embodiments, a contextual multi-arm bandit machine learning model may be applied where the customer interaction base may be split into two or more populations or groups of customers. For example, some customers may be digitally-savvy and rely heavily on computerized devices to contact the bank, while some customers may not be digitally-savvy. The latter group may have no online digital enrollment to the financial institution's website or mobile app. In this case, customer verification module 46 may ask a trick question such as "when was the last time you logged in using your cell phone app?"

Figure 5:
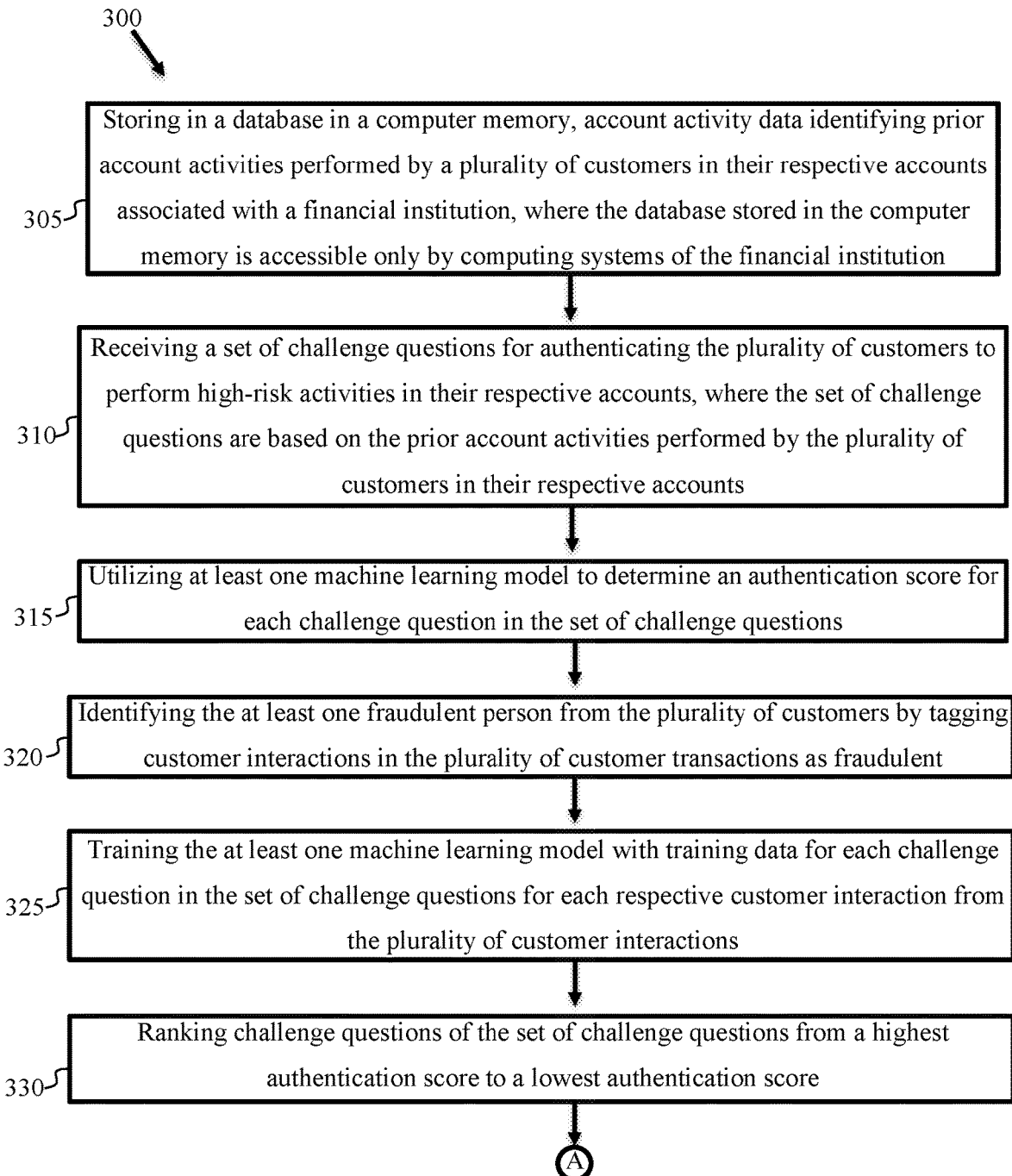
FIG. 5 illustrates a flowchart of an exemplary method for managing authentication challenge questions in a database and uses thereof, in accordance with one or more embodiments of the present disclosure.
Figure 5:
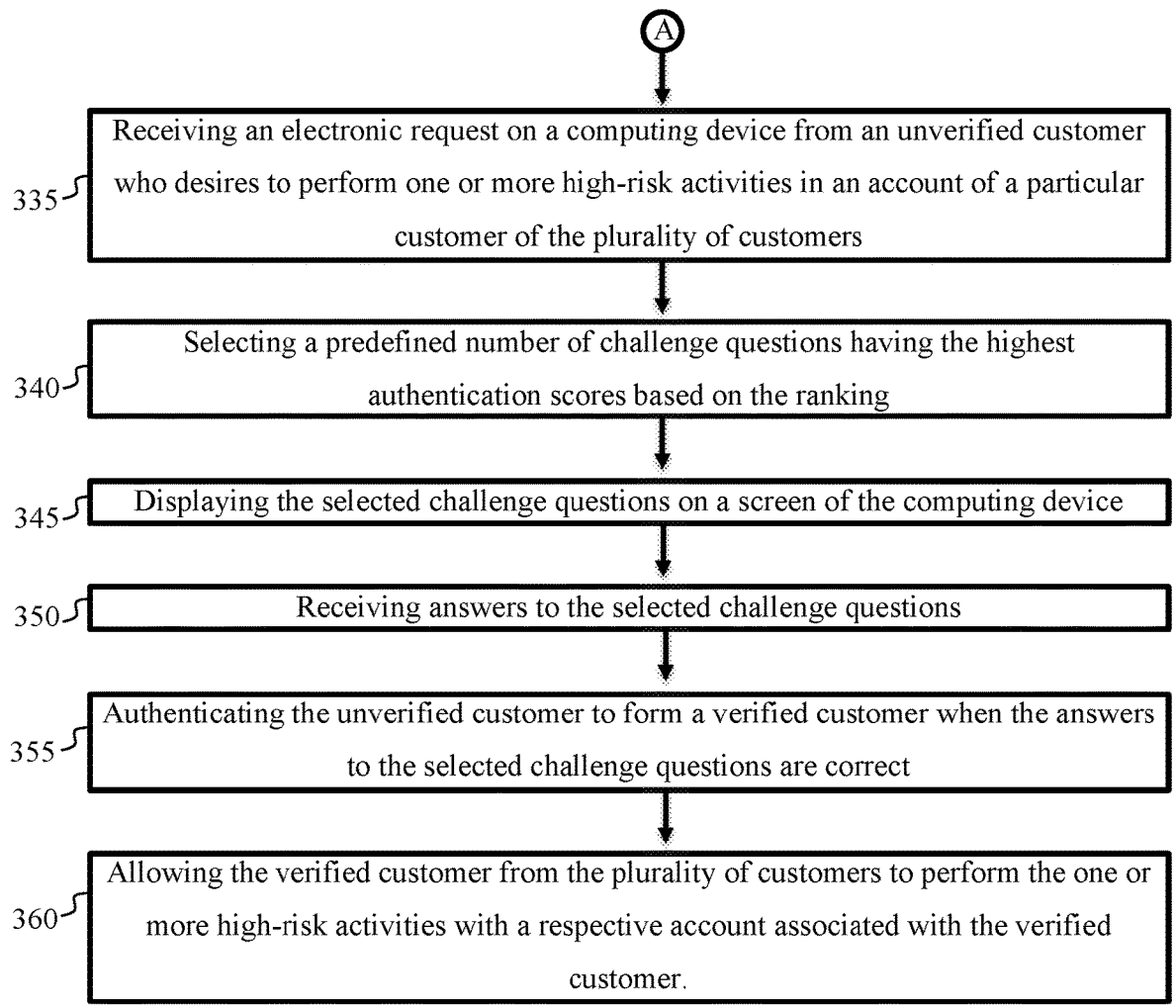

FIG. 5 illustrates a flowchart of an exemplary method 300 for managing authentication challenge questions in a database and uses thereof, in accordance with one or more embodiments of the present disclosure. Method 300 may be performed by processor 20 of server 15.

Method 300 may include storing 305 in a database in a computer memory, account activity data identifying prior account activities performed by a plurality of customers in their respective accounts associated with a financial institution, where the database stored in the computer memory is accessible only by computing systems of the financial institution Method 300 may include receiving 310 a set of challenge questions for authenticating the plurality of customers to perform high-risk activities in their respective accounts, where the set of challenge questions are based on the prior account activities performed by the plurality of customers in their respective accounts.

Method 300 may include utilizing 315 at least one machine learning model to determine an authentication score for each challenge question in the set of challenge questions.

Method 300 may include identifying 320 the at least one fraudulent person from the plurality of customers by tagging customer interactions in the plurality of customer transactions as fraudulent.

Method 300 may include training 325 the at least one machine learning model with training data for each challenge question in the set of challenge questions for each respective customer interaction from the plurality of customer interactions.

Method 300 may include ranking 330 challenge questions of the set of challenge questions from a highest authentication score to a lowest authentication score.

Method 300 may include receiving 335 an electronic request on a computing device from an unverified customer who desires to perform one or more high-risk activities in an account of a particular customer of the plurality of customers.

Method 300 may include selecting 340 a predefined number of challenge questions having the highest authentication scores based on the ranking.

Method 300 may include displaying 345 the selected challenge questions on a screen of the computing device.

Method 300 may include receiving 350 answers to the selected challenge questions.

Method 300 may include authenticating 355 the unverified customer to form a verified customer when the answers to the selected challenge questions are correct.

Method 300 may include allowing 360 the verified customer from the plurality of customers to perform the one or more high-risk activities with a respective account associated with the verified customer.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
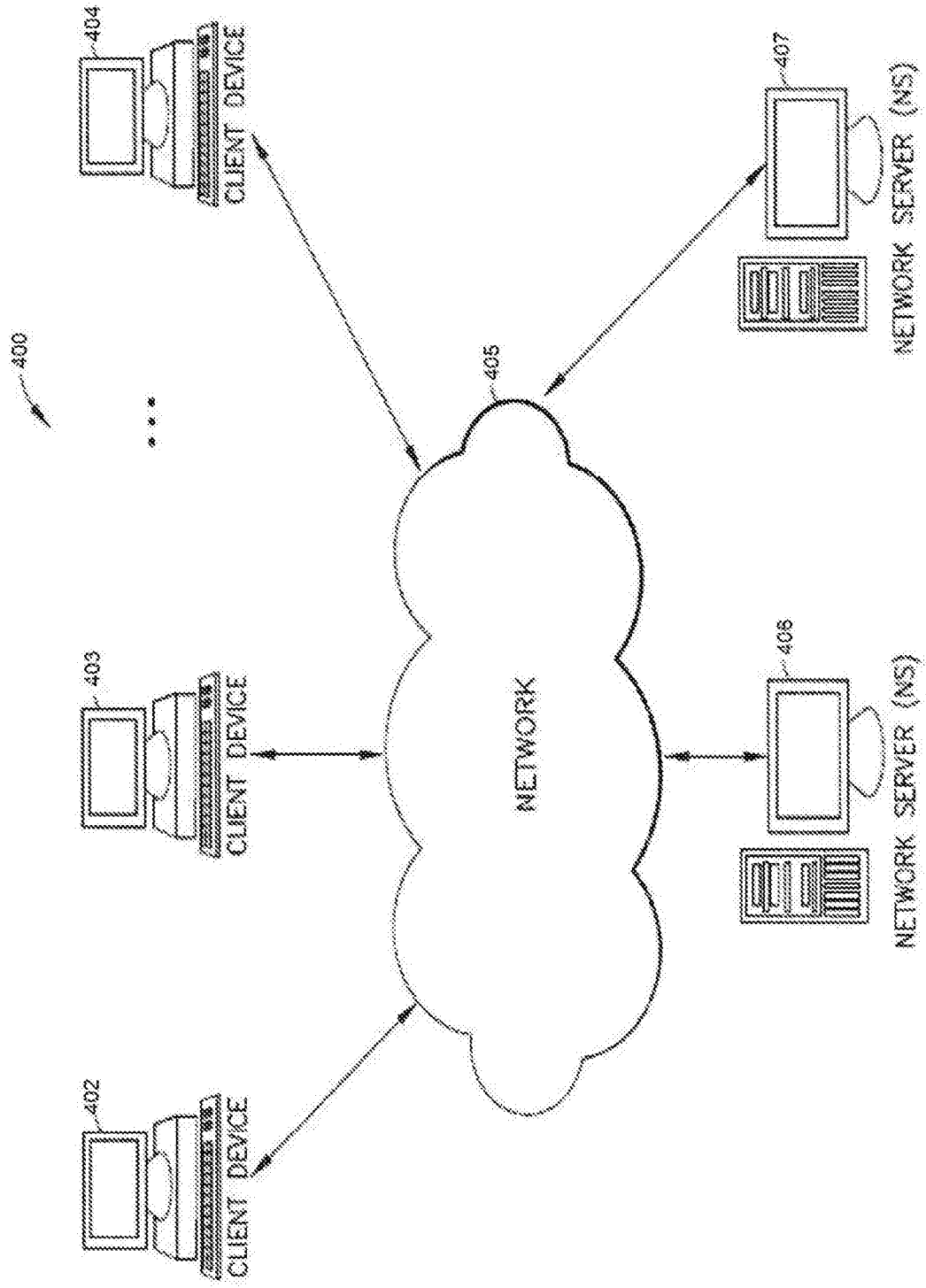
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
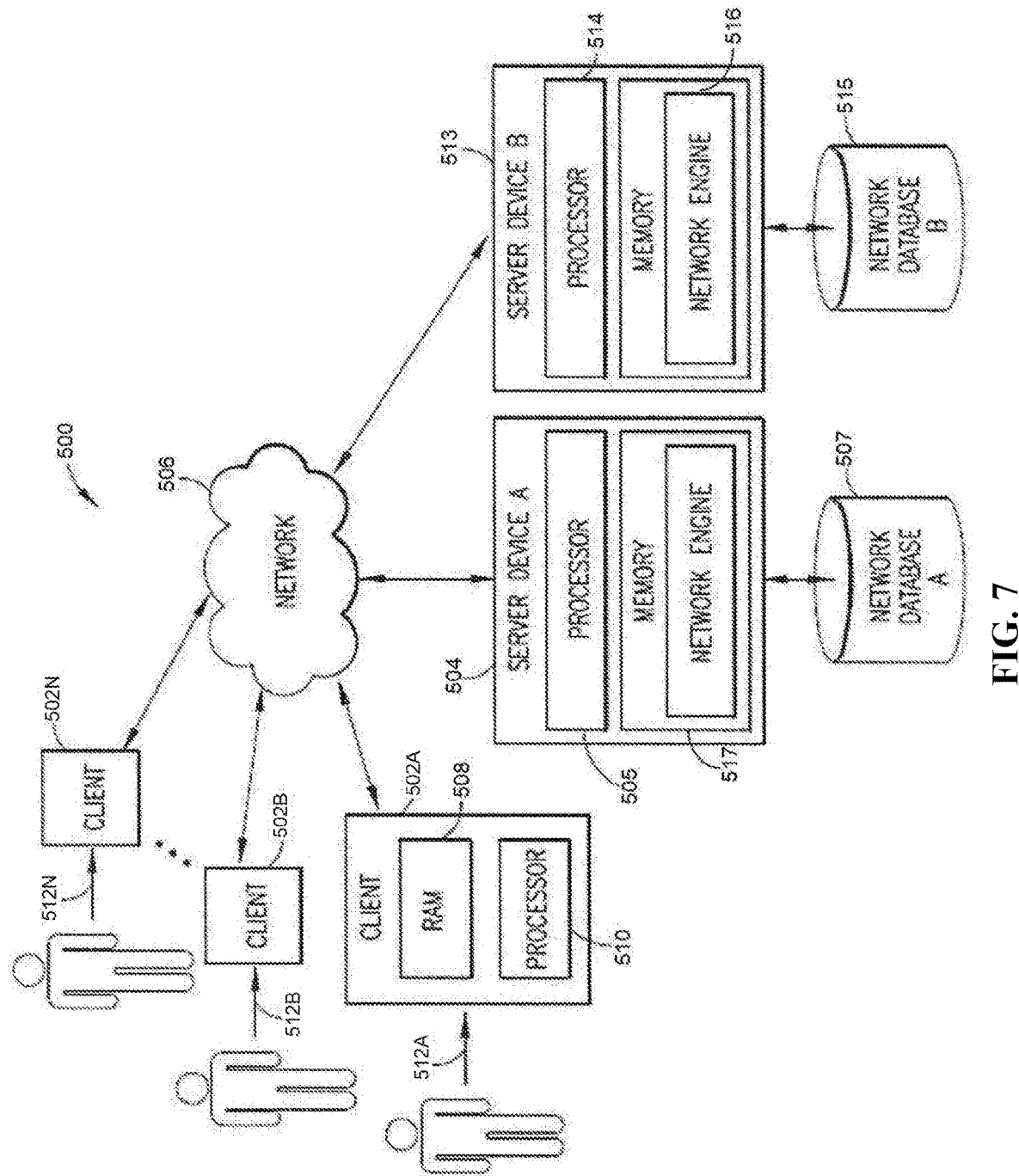
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502A, 502B thru 502N shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502A, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502A-N may also comprise a number of external or internal devices such as a mouse, a CD-ROM, DVD, a physical or virtual keyboard, a display, or other input or output devices. In some embodiments, examples of member computing devices 502A-N (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502A-N may be specifically programmed with one or more application programs in accordance with one or more principles/methodologies detailed herein. In some embodiments, member computing devices 502A-N may operate on any operating system capable of supporting a browser or browser-enabled application, such as Microsoft™, Windows™, and/or Linux. In some embodiments, member computing devices 502A-N shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502A-N, users, 512A-N, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502A-N may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
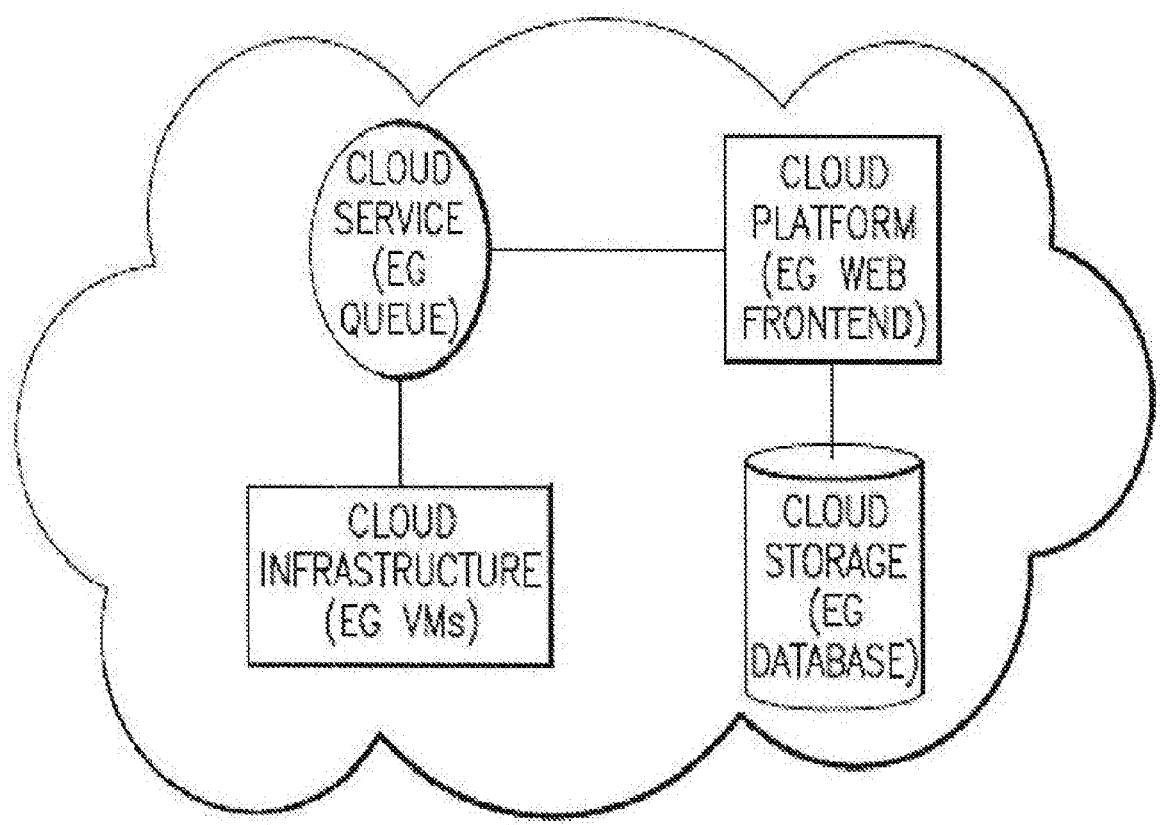
FIGS. 8 and 9 are diagrams illustrating implementations of cloud computing architecture/aspects with respect to which the disclosed technology may be specifically configured to operate, in accordance with one or more embodiments of the present disclosure.
Figure 9:
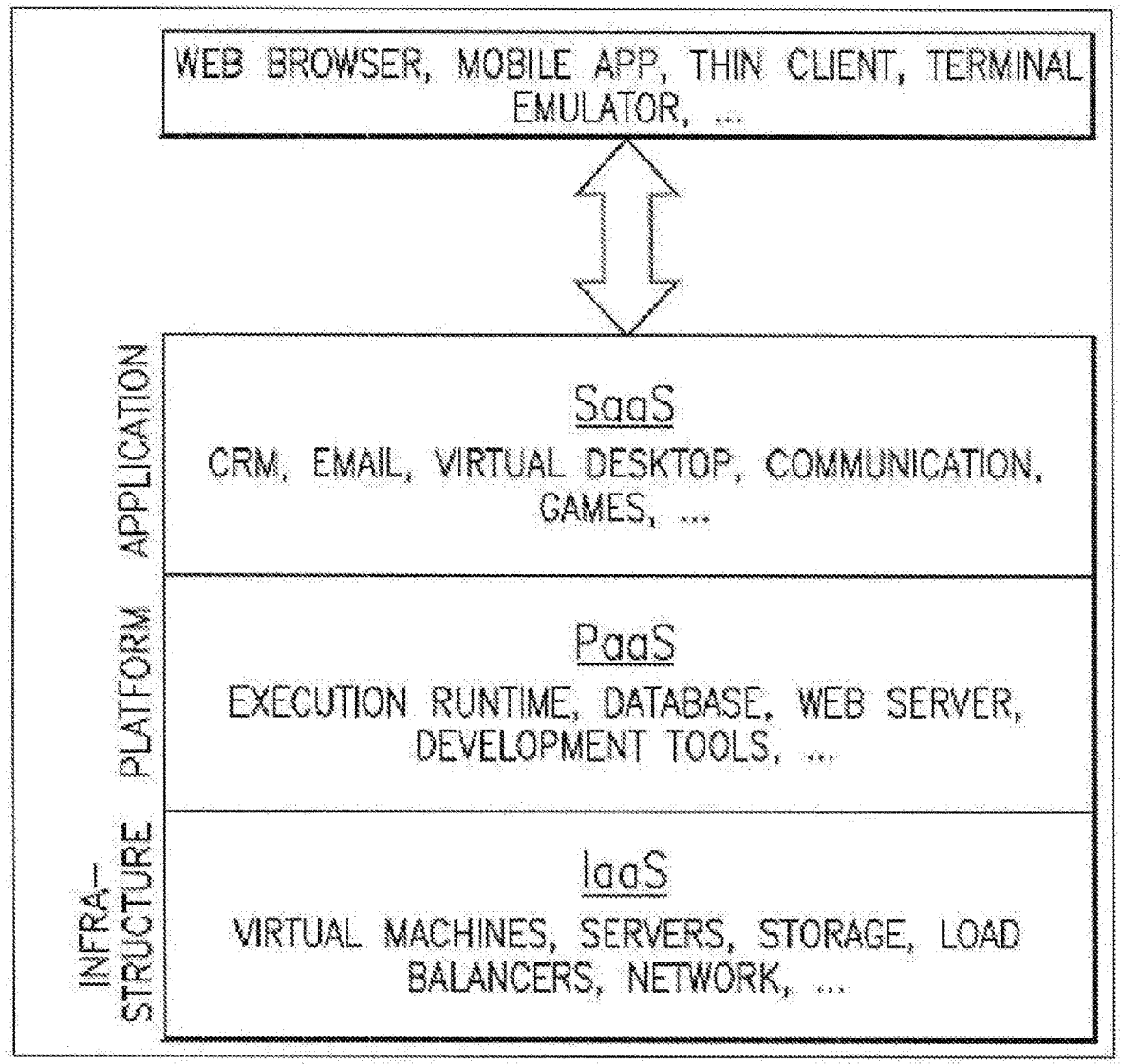

In some embodiments, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a method may include:

storing, by a processor, in a database in a computer memory, account activity data identifying prior account activities performed by a plurality of customers in their respective accounts associated with a financial institution;

where the database stored in the computer memory may be accessible only by computing systems of the financial institution;

receiving, by the processor, a set of challenge questions for authenticating the plurality of customers to perform high-risk activities in their respective accounts;

where the set of challenge questions may be based on the prior account activities performed by the plurality of customers in their respective accounts;

utilizing, by the processor, at least one machine learning model to determine an authentication score for each challenge question in the set of challenge questions;

where the authentication score of each respective challenge question may be based on:

i) a first number of instances of a plurality of customer interactions with the financial institution that a correct answer to a respective challenge question in the set of challenge questions has been given by the plurality of customers of the financial institution, ii) a second number of instances of the plurality of customer interactions with the financial institution that the correct answer to the respective challenge question in the set of challenge questions has been given by at least one fraudulent person, iii) a third number of instances of the plurality of customer interactions with the financial institution that an incorrect answer to a respective challenge question in the set of challenge questions has been given by the plurality of customers of the financial institution, and iv) a fourth number of instances of the plurality of customer interactions with the financial institution that the incorrect answer to the respective challenge question in the set of challenge questions has been given by the at least one fraudulent person;

identifying, by the processor, the at least one fraudulent person from the plurality of customers by tagging customer interactions in the plurality of customer transactions as fraudulent;

training, by the processor, the at least one machine learning model with training data for each challenge question in the set of challenge questions for each respective customer interaction from the plurality of customer interactions;

where the training data may include:
(i) a first indication that a correct or an incorrect answer was given for each challenge question in the set of challenge questions for each respective customer interaction from the plurality of customer interactions, and
(ii) a second indication of a fraud tag applied to each respective customer interaction from the plurality of customer interactions;

ranking, by the processor, challenge questions of the set of challenge questions from a highest authentication score to a lowest authentication score;

receiving, by the processor, an electronic request on a computing device from an unverified customer who desires to perform one or more high-risk activities in an account of a particular customer of the plurality of customers;

selecting, by the processor, a predefined number of challenge questions having the highest authentication scores based on the ranking;

causing, by the processor, to display on a screen of the computing device the selected challenge questions;

receiving, by the processor, answers to the selected challenge questions;

authenticating, by the processor, the unverified customer to form a verified customer when the answers to the selected challenge questions are correct; and allowing, by the processor, the verified customer from the plurality of customers to perform the one or more high-risk activities with a respective account associated with the verified customer.

In some embodiments, identifying the at least one fraudulent person from the plurality of customers by tagging customer interactions in the plurality of customer transactions as fraudulent may include receiving a customer self-report that a customer interaction from the plurality of customer transactions with the financial institution is fraudulent.

In some embodiments, identifying the at least one fraudulent person from the plurality of customers by tagging customer interactions in the plurality of customer transactions as fraudulent may include receiving a notification from a fraud department of the financial institution indicating that a customer interaction from the plurality of customer transactions with the financial institution is fraudulent.

In some embodiments, identifying the at least one fraudulent person from the plurality of customers by tagging customer interactions in the plurality of customer transactions as fraudulent may include assessing that the unverified customer communicated with the financial institution through an IP address or a telephone number previously associated with fraudulent activity.

In some embodiments, the high-risk activities in the respective accounts of the plurality of customers may be selected from the group consisting of: a change of an account address, a change of an account e-mail address, a change in a cellphone number associated with an account, a change in a telephone number associated with an account, a balance transfer request, and a request to have a credit card sent to a new address.

In some embodiments, receiving answers to the selected challenge questions may be selected from the group consisting of: entering the answers of the unverified customer by an agent of the financial institution into a computer terminal of the agent while communicating with the unverified customer, receiving the answers through a webpage of the financial institution from the unverified user, and receiving the answers through a mobile application of the financial institution from the unverified user.

In some embodiments, the at least one machine learning model may be selected from the group consisting of a multi-armed bandit model and a multiclass classifier neural network model.

In some embodiments, training the at least one machine learning model with the training data may include training the machine learning model at predefined time intervals with new training data.

In some embodiments, training the at least one machine learning model with the training data may include applying a loss function to the training data.

In some embodiments, training the at least one machine learning model with the training data may include splitting the training data for each respective customer interaction from the plurality of customer interactions into two sets of training data with a first set for digitally savvy customers and a second set for non-digitally savvy customers.

In some embodiments, a system may include a computer memory and a processor. The processor may be configured to:

store in a database in the computer memory, account activity data identifying prior account activities performed by a plurality of customers in their respective accounts associated with a financial institution;

where the database stored in the computer memory may be accessible only by computing systems of the financial institution;

receive a set of challenge questions for authenticating the plurality of customers to perform high-risk activities in their respective accounts;

where the set of challenge questions may be based on the prior account activities performed by the plurality of customers in their respective accounts;

utilize at least one machine learning model to determine an authentication score for each challenge question in the set of challenge questions;

where the authentication score of each respective challenge question may be based on:

i) a first number of instances of a plurality of customer interactions with the financial institution that a correct answer to a respective challenge question in the set of challenge questions has been given by the plurality of customers of the financial institution, ii) a second number of instances of the plurality of customer interactions with the financial institution that the correct answer to the respective challenge question in the set of challenge questions has been given by at least one fraudulent person, iii) a third number of instances of the plurality of customer interactions with the financial institution that an incorrect answer to the respective challenge question in the set of challenge questions has been given by the plurality of customers of the financial institution, and iv) a fourth number of instances of the plurality of customer interactions with the financial institution that the incorrect answer to the respective challenge question in the set of challenge questions has been given by the at least one fraudulent person;

identify the at least one fraudulent person from the plurality of customers by tagging customer interactions in the plurality of customer transactions as fraudulent;

train the at least one machine learning model with training data for each challenge question in the set of challenge questions for each respective customer interaction from the plurality of customer interactions;

where the training data may include:

(i) a first indication that a correct or an incorrect answer was given for each challenge question in the set of challenge questions for each respective customer interaction from the plurality of customer interactions, and (ii) a second indication of a fraud tag applied to each respective customer interaction from the plurality of customer interactions;

rank challenge questions of the set of challenge questions from a highest authentication score to a lowest authentication score;

receive an electronic request on a computing device from an unverified customer who desires to perform one or more high-risk activities in an account of a particular customer of the plurality of customers;

select a predefined number of challenge questions having the highest authentication scores based on the ranking;

cause to display on a screen of the computing device the selected challenge questions;

receive answers to the selected challenge questions;

authenticate the unverified customer to form a verified customer when the answers to the selected challenge questions are correct; and allow the verified customer from the plurality of customers to perform the one or more high-risk activities with a respective account associated with the verified customer.

In some embodiments, the processor may be configured to identify the at least one fraudulent person from the plurality of customers by tagging customer interactions in the plurality of customer transactions as fraudulent by receiving a customer self-report that a customer interaction from the plurality of customer transactions with the financial institution is fraudulent.

In some embodiments, the processor may be configured to identify the at least one fraudulent person from the plurality of customers by tagging customer interactions in the plurality of customer transactions as fraudulent by receiving a notification from a fraud department of the financial institution indicating that a customer interaction from the plurality of customer transactions with the financial institution is fraudulent.

In some embodiments, the processor may be configured to identify the at least one fraudulent person from the plurality of customers by tagging customer interactions in the plurality of customer transactions as fraudulent by assessing that the unverified customer communicated with the financial institution through an IP address or a telephone number previously associated with fraudulent activity.

In some embodiments, the high-risk activities in the respective accounts of the plurality of customers may be selected from the group consisting of: a change of an account address, a change of an account e-mail address, a change in a cellphone number associated with an account, a change in a telephone number associated with an account, a balance transfer request, and a request to have a credit card sent to a new address.

In some embodiments, the processor may be configured to receive answers to the selected challenge questions is selected from the group consisting of entering the answers of the unverified customer by an agent of the financial institution into a computer terminal of the agent while communicating with the unverified customer, receiving the answers through a webpage of the financial institution from the unverified user, and receiving the answers through a mobile application of the financial institution from the unverified user.

In some embodiments, the at least one machine learning model may be selected from the group consisting of a multi-armed bandit model and a multiclass classifier neural network model.

In some embodiments, the processor may be configured to train the at least one machine learning model with the training data by training the machine learning model at predefined time intervals with new training data.

In some embodiments, the processor may be configured to train the at least one machine learning model with the training data by applying a loss function to the training data.

In some embodiments, the processor may be configured to train the at least one machine learning model with the training data by splitting the training data for each respective customer interaction from the plurality of customer interactions into two sets of training data with a first set for digitally savvy customers and a second set for non-digitally savvy customers.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
storing, by a processor, in a database in a computer memory, account activity data identifying prior account activities performed by a plurality of customers in their respective accounts associated with a financial institution;
wherein the database stored in the computer memory is accessible only by computing systems of the financial institution;
receiving, by the processor, a set of challenge questions for authenticating the plurality of customers to perform high-risk activities in their respective accounts;
wherein the set of challenge questions are based on the prior account activities performed by the plurality of customers in their respective accounts;
utilizing, by the processor, at least one machine learning model to determine an authentication score for each challenge question in the set of challenge questions;
wherein the authentication score of each respective challenge question is based on:
i) a first number of instances of a plurality of customer interactions with the financial institution that a correct answer to a respective challenge question in the set of challenge questions has been given by the plurality of customers of the financial institution,
ii) a second number of instances of the plurality of customer interactions with the financial institution that the correct answer to the respective challenge question in the set of challenge questions has been given by at least one fraudulent person,
iii) a third number of instances of the plurality of customer interactions with the financial institution that an incorrect answer to the respective challenge question in the set of challenge questions has been given by the plurality of customers of the financial institution, and
iv) a fourth number of instances of the plurality of customer interactions with the financial institution that the incorrect answer to the respective challenge question in the set of challenge questions has been given by the at least one fraudulent person;
identifying, by the processor, the at least one fraudulent person from the plurality of customers by tagging customer interactions in the plurality of customer transactions as fraudulent;
training, by the processor, the at least one machine learning model with training data for each challenge question in the set of challenge questions for each respective customer interaction from the plurality of customer interactions;
wherein the training data comprises:
(iii) a first indication that a correct or an incorrect answer was given for each challenge question in the set of challenge questions for each respective customer interaction from the plurality of customer interactions, and
(iv) a second indication of a fraud tag applied to each respective customer interaction from the plurality of customer interactions;
ranking, by the processor, challenge questions of the set of challenge questions from a highest authentication score to a lowest authentication score;
receiving, by the processor, an electronic request on a computing device from an unverified customer who desires to perform one or more high-risk activities in an account of a particular customer of the plurality of customers;
selecting, by the processor, a predefined number of challenge questions having the highest authentication scores based on the ranking;
causing, by the processor, to display on a screen of the computing device the selected challenge questions;
receiving, by the processor, answers to the selected challenge questions;
authenticating, by the processor, the unverified customer to form a verified customer when the answers to the selected challenge questions are correct; and
allowing, by the processor, the verified customer from the plurality of customers to perform the one or more high-risk activities with a respective account associated with the verified customer.

2. The method according to claim 1, wherein identifying the at least one fraudulent person from the plurality of customers by tagging customer interactions in the plurality of customer transactions as fraudulent comprises receiving a customer self-report that a customer interaction from the plurality of customer transactions with the financial institution is fraudulent.

3. The method according to claim 1, wherein identifying the at least one fraudulent person from the plurality of customers by tagging customer interactions in the plurality of customer transactions as fraudulent comprises receiving a notification from a fraud department of the financial institution indicating that a customer interaction from the plurality of customer transactions with the financial institution is fraudulent.

4. The method according to claim 1, wherein identifying the at least one fraudulent person from the plurality of customers by tagging customer interactions in the plurality of customer transactions as fraudulent comprises assessing that the unverified customer communicated with the financial institution through an IP address or a telephone number previously associated with fraudulent activity.

5. The method according to claim 1, wherein the high-risk activities in the respective accounts of the plurality of customers are selected from the group consisting of: a change of an account address, a change of an account e-mail address, a change in a cellphone number associated with an account, a change in a telephone number associated with an account, a balance transfer request, and a request to have a credit card sent to a new address.

6. The method according to claim 1, wherein receiving answers to the selected challenge questions is selected from the group consisting of: entering the answers of the unverified customer by an agent of the financial institution into a computer terminal of the agent while communicating with the unverified customer, receiving the answers through a webpage of the financial institution from the unverified user, and receiving the answers through a mobile application of the financial institution from the unverified user.

7. The method according to claim 1, wherein the at least one machine learning model is selected from the group consisting of a multi-armed bandit model and a multiclass classifier neural network model.

8. The method according to claim 1, wherein training the at least one machine learning model with the training data comprises training the machine learning model at predefined time intervals with new training data.

9. The method according to claim 1, wherein training the at least one machine learning model with the training data comprises applying a loss function to the training data.

10. The method according to claim 1, wherein training the at least one machine learning model with the training data comprises splitting the training data for each respective customer interaction from the plurality of customer interactions into two sets of training data with a first set for digitally savvy customers and a second set for non-digitally savvy customers.

11. A system, comprising:
a computer memory; and
a processor configured to:
store in a database in the computer memory, account activity data identifying prior account activities performed by a plurality of customers in their respective accounts associated with a financial institution;
wherein the database stored in the computer memory is accessible only by computing systems of the financial institution;
receive a set of challenge questions for authenticating the plurality of customers to perform high-risk activities in their respective accounts;
wherein the set of challenge questions are based on the prior account activities performed by the plurality of customers in their respective accounts;
utilize at least one machine learning model to determine an authentication score for each challenge question in the set of challenge questions;
wherein the authentication score of each respective challenge question is based on:
i) a first number of instances of a plurality of customer interactions with the financial institution that a correct answer to a respective challenge question in the set of challenge questions has been given by the plurality of customers of the financial institution,
ii) a second number of instances of the plurality of customer interactions with the financial institution that the correct answer to the respective challenge question in the set of challenge questions has been given by at least one fraudulent person,
iii) a third number of instances of the plurality of customer interactions with the financial institution that an incorrect answer to the respective challenge question in the set of challenge questions has been given by the plurality of customers of the financial institution, and
iv) a fourth number of instances of the plurality of customer interactions with the financial institution that the incorrect answer to the respective challenge question in the set of challenge questions has been given by the at least one fraudulent person;
identify the at least one fraudulent person from the plurality of customers by tagging customer interactions in the plurality of customer transactions as fraudulent;
train the at least one machine learning model with training data for each challenge question in the set of challenge questions for each respective customer interaction from the plurality of customer interactions;
wherein the training data comprises:
(i) a first indication that a correct or an incorrect answer was given for each challenge question in the set of challenge questions for each respective customer interaction from the plurality of customer interactions, and
(ii) a second indication of a fraud tag applied to each respective customer interaction from the plurality of customer interactions;
rank challenge questions of the set of challenge questions from a highest authentication score to a lowest authentication score;
receive an electronic request on a computing device from an unverified customer who desires to perform one or more high-risk activities in an account of a particular customer of the plurality of customers;
select a predefined number of challenge questions having the highest authentication scores based on the ranking;
cause to display on a screen of the computing device the selected challenge questions;
receive answers to the selected challenge questions;
authenticate the unverified customer to form a verified customer when the answers to the selected challenge questions are correct; and
allow the verified customer from the plurality of customers to perform the one or more high-risk activities with a respective account associated with the verified customer.

12. The system according to claim 11, wherein the processor is configured to identify the at least one fraudulent person from the plurality of customers by tagging customer interactions in the plurality of customer transactions as fraudulent by receiving a customer self-report that a customer interaction from the plurality of customer transactions with the financial institution is fraudulent.

13. The system according to claim 11, wherein the processor is configured to identify the at least one fraudulent person from the plurality of customers by tagging customer interactions in the plurality of customer transactions as fraudulent by receiving a notification from a fraud department of the financial institution indicating that a customer interaction from the plurality of customer transactions with the financial institution is fraudulent.

14. The system according to claim 11, wherein the processor is configured to identify the at least one fraudulent person from the plurality of customers by tagging customer interactions in the plurality of customer transactions as fraudulent by assessing that the unverified customer communicated with the financial institution through an IP address or a telephone number previously associated with fraudulent activity.

15. The system according to claim 11, wherein the high-risk activities in the respective accounts of the plurality of customers are selected from the group consisting of: a change of an account address, a change of an account e-mail address, a change in a cellphone number associated with an account, a change in a telephone number associated with an account, a balance transfer request, and a request to have a credit card sent to a new address.

16. The system according to claim 11, wherein the processor is configured to receive answers to the selected challenge questions is selected from the group consisting of entering the answers of the unverified customer by an agent of the financial institution into a computer terminal of the agent while communicating with the unverified customer, receiving the answers through a webpage of the financial institution from the unverified user, and receiving the answers through a mobile application of the financial institution from the unverified user.

17. The system according to claim 11, wherein the at least one machine learning model is selected from the group consisting of a multi-armed bandit model and a multiclass classifier neural network model.

18. The system according to claim 11, wherein the processor is configured to train the at least one machine learning model with the training data by training the machine learning model at predefined time intervals with new training data.

19. The system according to claim 11, wherein the processor is configured to train the at least one machine learning model with the training data by applying a loss function to the training data.

20. The system according to claim 11, wherein the processor is configured to train the at least one machine learning model with the training data by splitting the training data for each respective customer interaction from the plurality of customer interactions into two sets of training data with a first set for digitally savvy customers and a second set for non-digitally savvy customers.

* * * * *